United States Patent
Choi et al.

(10) Patent No.: US 12,512,483 B2
(45) Date of Patent: Dec. 30, 2025

(54) MANUFACTURING METHOD OF ELECTRODE FOR ELECTROCHEMICAL REACTION, ELECTRODE FOR ELECTROCHEMICAL REACTION MANUFACTURED THEREFROM AND REVERSE ELECTRODIALYSIS ELECTRIC GENERATING DEVICE

(71) Applicant: Kangwon University-Industry Cooperation Foundation, Chuncheon-si (KR)

(72) Inventors: Insoo Choi, Seoul (KR); Seongbeom Kim, Samcheok-si (KR); Hyemin Jung, Seoul (KR); Jungmin Choi, Seoul (KR); Seunghwan Lee, Seoul (KR); Hakju Lee, Paju-si (KR)

(73) Assignee: Kangwon University—Industry Cooperation Foundation, Chuncheon-si (KR)

( * ) Notice: Subject to any disclaimer, the term of this patent is extended or adjusted under 35 U.S.C. 154(b) by 35 days.

(21) Appl. No.: 18/178,996

(22) Filed: Mar. 6, 2023

(65) Prior Publication Data
US 2023/0290963 A1    Sep. 14, 2023

(30) Foreign Application Priority Data
Mar. 11, 2022   (KR) .................. 10-2022-0030423

(51) Int. Cl.
*C23C 16/48*    (2006.01)
*C23C 16/18*    (2006.01)
*C23C 16/448*   (2006.01)
*H01M 4/88*     (2006.01)
*H01M 4/90*     (2006.01)
*H01M 8/22*     (2006.01)

(52) U.S. Cl.
CPC .......... *H01M 4/8867* (2013.01); *C23C 16/18* (2013.01); *C23C 16/4482* (2013.01); *C23C 16/483* (2013.01); *H01M 4/9041* (2013.01); *H01M 8/227* (2013.01)

(58) Field of Classification Search
None
See application file for complete search history.

(56) References Cited

U.S. PATENT DOCUMENTS

2005/0016839 A1*   1/2005   Horne ................ C23C 16/483
                                                        429/495
2021/0001276 A1*   1/2021   Griffis ................ H01M 8/227

* cited by examiner

*Primary Examiner* — Joshua L Allen
*Assistant Examiner* — Bradford M Gates
(74) *Attorney, Agent, or Firm* — STIP Law Group, LLC

(57) ABSTRACT

Provided is a manufacturing method of an electrode for an electrochemical reaction, which is capable of minimizing a loss of a metal precursor and simultaneously reducing a manufacturing time. An embodiment of the present invention provides a manufacturing method of an electrode for an electrochemical reaction, which includes a process of forming a metal thin-film on a substrate disposed in a reactor and in which the metal thin-film is formed as a metal precursor gas derived from a metal precursor is thermally decomposed by a $CO_2$-laser.

7 Claims, 7 Drawing Sheets

MANUFACTURING METHOD OF ELECTRODE FOR ELECTROCHEMICAL REACTION, ELECTRODE FOR ELECTROCHEMICAL REACTION MANUFACTURED THEREFROM AND REVERSE ELECTRODIALYSIS ELECTRIC GENERATING DEVICE

CROSS-REFERENCE TO RELATED APPLICATIONS

This U.S. non-provisional patent application claims priority under 35 U.S.C. § 119 of Korean Patent Application No. 10-2022-0030423, filed on Mar. 11, 2022, the entire contents of which are hereby incorporated by reference.

BACKGROUND

The present invention relates to a manufacturing method of an electrode for an electrochemical reaction, an electrode for an electrochemical reaction manufactured therefrom, and a reverse electrodialysis electric generating device.

A plurality of energy conversion and storage devices are manufactured and driven based on an electro-chemical reaction principle. Energy production and storage using the above-described devices accompany electric charge transmission through an electrode, and an electrode property having a low energy barrier and a high reaction rate is required for efficient electric charge transmission.

Various materials and various types of electrodes are used according to kinds of electrochemical reactions, and in recent years, researches on highly active electrodes capable of reducing energy required to produce electrical energy have been conducted in a field of electrolysis or fuel cells that are highly spotlighted in recent years.

A reverse electro-dialysis (RED) electric generating device that is a representative ocean energy generating device has a technology that produces electricity from an ion flow caused by a difference between concentrations of seawater and freshwater and uses a metal-based electrode or a metal oxide-based electrode to convert ionic current into electrical current. In a general reverse electrodialysis electric generating device, a cation exchange membrane and an anion exchange membrane are alternately arranged, seawater and freshwater are supplied to a space formed thereby, and electrodes are mounted onto both sides of the reverse electrodialysis electric generating device.

In relation to this, a demand for continuous development and supply of a dimensionally stable anode (DSA) that is highly active and is used for a long time without being dissolved is increasing in a field of a reverse electrodialysis electric generating device that requires a strong corrosive environment.

The DSA refers to an electrode made of titanium (Ti), ruthenium (Ru), iridium (Jr), and oxides thereof alone or in combination. Main manufacturing methods of the DSA to be applied to the above-described application fields include a reduction method by thermal decomposition, anodic oxidation, and a sol-gel method, and among the manufacturing methods, the thermal decomposition method is most widely used as a production method of a commercial electrode. The above-described thermal decomposition method has an advantage of most stably manufacturing the DSA but has a disadvantage of requiring high energy and a long manufacturing time. Also, the thermal decomposition method has a limitation of low economic feasibility due to a loss of a metal precursor inputted in a thermal decomposition process.

SUMMARY

The present invention provides a manufacturing method of an electrode for an electrochemical reaction, which is capable of minimizing a loss of a metal precursor and reducing a manufacturing time.

The present invention also provides a manufacturing method of an electrode for an electrochemical reaction, which is capable of increasing a maximum power density of an electrochemical electric generating device.

The present invention also provides an electrode for an electrochemical reaction, which is manufactured by the manufacturing method of the electrode for the electrochemical reaction.

The present invention also provides a reverse electrodialysis electric generating device including the electrode for the electrochemical reaction.

The objects of the present invention are not limited to the aforesaid, but other objects not described herein will be clearly understood by those skilled in the art from descriptions below. Also, the objects and advantages of the present invention the means as claimed and combinations thereof may be easily realized by it will be seen.

An embodiment of the present invention provides a manufacturing method of an electrode for an electrochemical reaction, which includes a process of forming a metal thin-film on a substrate disposed in a reactor and in which the metal thin-film is formed as a metal precursor gas derived from a metal precursor is thermally decomposed by a $CO_2$-laser.

According to an embodiment of the present invention, the substrate may be a porous substrate, and the porous substrate may be, e.g., a substrate made of a material such as Ti, Ni, Fe—Cr, Fe—Cr—Ni, carbon cloth, or carbon felt, and more specifically, a stainless steel mesh.

According to an embodiment of the present invention, the metal thin-film may be made of one selected from the group consisting of pure metal, an alloy, a metal oxide, and a combination thereof. For example, the metal thin-film may be a Ti thin-film or a $TiO_2$ thin-film.

According to an embodiment of the present invention, the metal precursor may be one selected from the group consisting of a titanium precursor, a ruthenium precursor, an iridium precursor, and a combination thereof, specifically, a titanium precursor, and more specifically, a titanium tetraisopropoxide (TTIP).

According to an embodiment of the present invention, the reactor may be connected to a bubbler including the metal precursor therein through a gas flow channel, and the gas flow channel may include a photocatalyst gas. The photocatalyst gas may be one selected from commercial photocatalysts of the $CO_2$-laser such as $SF_6$ and $C_2H_4$.

According to another embodiment of the present invention, the gas flow channel may further include a hydrogen gas.

According to an embodiment of the present invention, the bubbler may include: an inlet through which a carrier gas is introduced thereinto; and an outlet through which the metal precursor gas and the carrier gas are discharged to the reactor.

Another embodiment of the present invention provides an electrode for an electrochemical reaction manufactured by the manufacturing method of the electrode for the electrochemical reaction Another embodiment of the present invention provides a reverse electrodialysis electric generating device including the electrode for the electrochemical reaction.

The above-described solution of the problems does not enumerate all features of the present invention. Various features of the present invention and advantages and effects thereof will be understood in more detail with reference to the following specific embodiments.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, preferred embodiments of the present invention will be described in detail with reference to the accompanying drawings. The present disclosure may, however, be embodied in different forms and should not be construed as limited to the embodiments and drawings set forth herein.

It will be understood that although the terms first and second are used herein to describe various elements, these elements should not be limited by these terms. For example, a first element referred to as a first element in one embodiment can be referred to as a second element in another embodiment without departing from the scope of the appended claims.

The terms of a singular form may include plural forms unless referred to the contrary. The meaning of 'include' or 'comprise' specifies a property, a fixed number, a step, an operation, an element, a component, or a combination thereof but does not exclude other properties, fixed numbers, steps, operations, elements, components, combinations thereof.

Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

An embodiment of the present invention provides a manufacturing method of an electrode for an electrochemical reaction, which includes a process of forming a metal thin-film on a substrate disposed in a reactor and in which the metal thin-film is formed as a metal precursor gas derived from a metal precursor is thermally decomposed by a $CO_2$-laser.

According to an embodiment of the present invention, a metal precursor gas in the reactor may be rapidly thermally decomposed by the $CO_2$-laser so that the metal thin-film is rapidly deposited onto the substrate to minimize a loss of a metal precursor and reduce a manufacturing time and cost. Also, according to an embodiment of the present invention, a maximum power density of a reverse electrodialysis electric generating device for an electrochemical reaction may be increased.

Hereinafter, configurations of the present invention will be described in more detail with reference to the drawings.
1. Manufacturing Method of Electrode for Electrochemical Reaction and Electrode for Electrochemical Reaction Manufactured Therefrom FIG. 1 is a schematic view illustrating a manufacturing method of an electrode for an electrochemical reaction according to an embodiment of the present invention.

Figure 3:
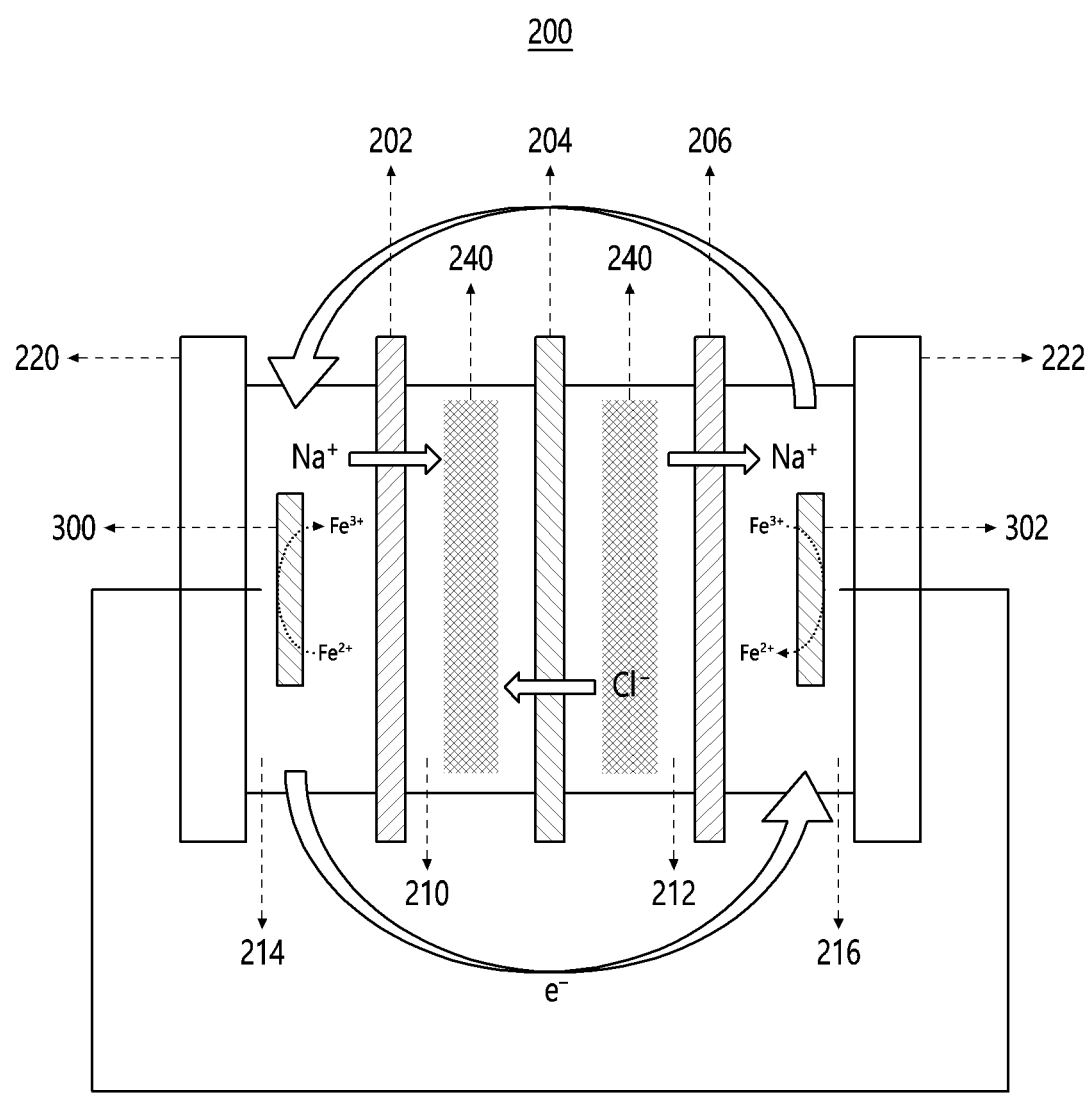
FIG. 3 is an image showing a bubbler for supplying an aero-sol precursor according to the present invention.

FIG. 3 is a view illustrating a bubbler for supplying an aero-sol precursor according to the present invention.

Figure 1:
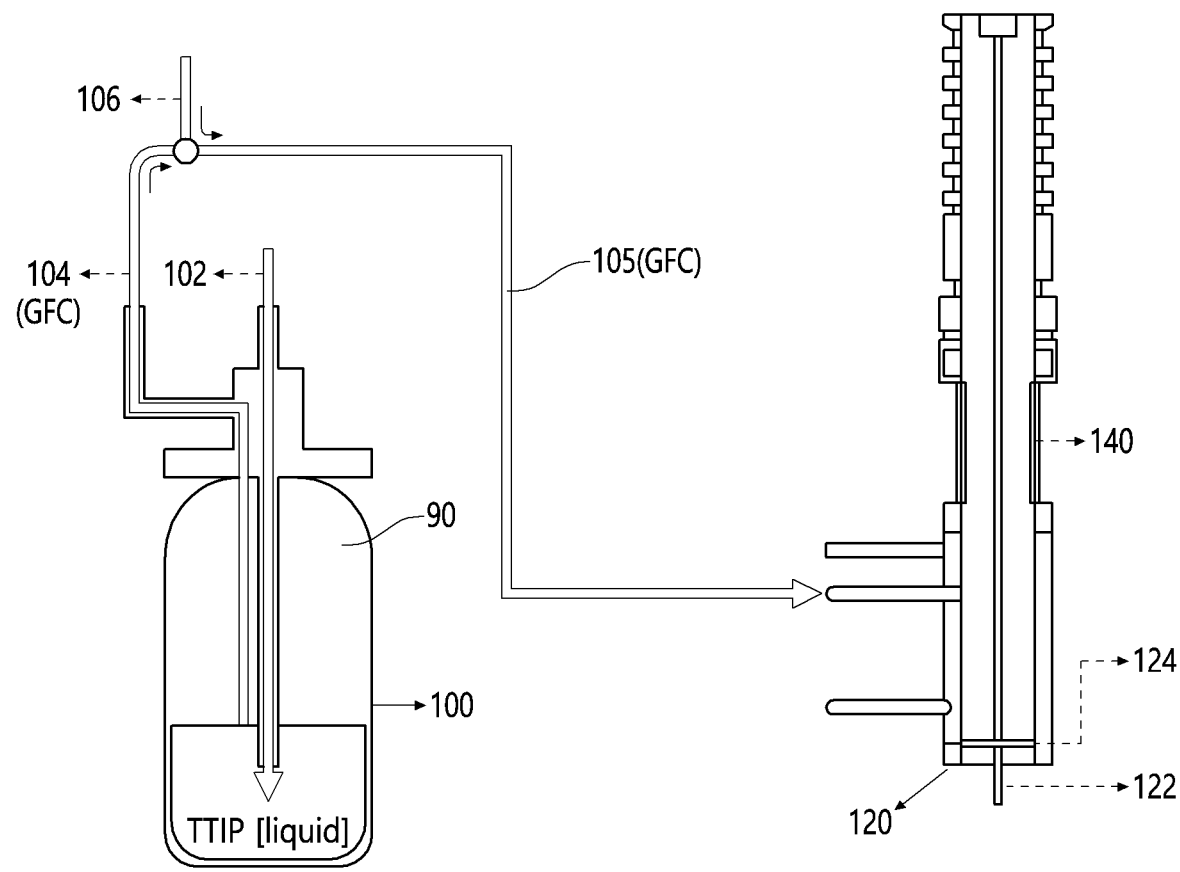
FIG. 1 is a schematic view illustrating a manufacturing method of an electrode for an electrochemical reaction according to an embodiment of the present invention.
Figure 2:
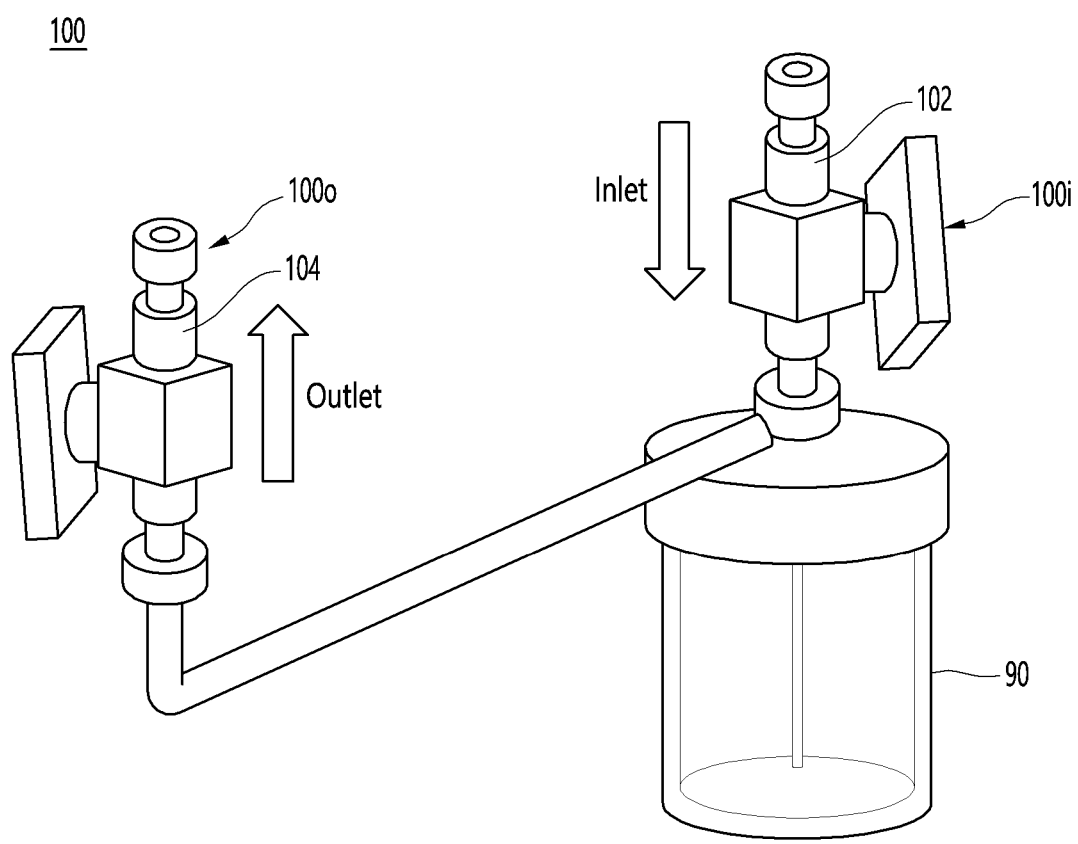
FIG. 2 is an image showing a feature in which a substrate 140 according to the present invention is fixed in a reactor 120 by a metal ring 150.

Referring to FIGS. 1 and 2, the manufacturing method of the electrode for the electrochemical reaction according to the present invention may include a process of forming a metal thin-film on a substrate 140 disposed in a reactor 120.

Here, the substrate 140 may be disposed on a central portion of the reactor 120.

The substrate 140 according to the present invention may be a non-porous substrate or a porous substrate, and specifically a porous substrate. The porous substrate may be, e.g., a substrate made of a material such as Ti, Ni, Fe—Cr, Fe—Cr—Ni, carbon cloth, or carbon felt, and more specifically, a stainless steel mesh. The porous substrate may increase a contact area with an electrode solution to increase a power generation efficiency of an electrochemical electric generating device.

The substrate 140 according to the present invention may be fixed in the reactor 120 by using a metal ring 150. The metal thin-film may be formed uniformly, stably, and repeatedly on the substrate 140 by fixing the substrate 140 at a position that allows a deposition efficiency in the reactor 120 to be maximized.

The metal thin-film according to the present invention may be made of one selected from the group consisting of pure metal, an alloy, a metal oxide, and a combination thereof. For example, the metal thin-film may be a Ti thin-film or a $TiO_2$ thin-film. The metal thin film may be deposited on the substrate 140 to increase a maximum power density of the electric generating device for an electrochemical reaction.

The metal precursor according to the present invention may be one selected from the group consisting of a titanium precursor, a ruthenium precursor, an iridium precursor, a copper precursor, a platinum precursor, and a combination thereof, specifically a titanium precursor, and more specifically, a titanium tetraisoprobeoxide (TTIP). The metal precursor may be disposed in a liquid state in a glass vial 90, and then vaporized into a gas state under an evaporation condition and converted into a metal precursor gas. In order to realize the evaporation condition, inner pressure of the bubbler may be, e.g., 0 torr to 760 torr and appropriately adjusted according to an amount of the metal precursor gas.

The metal thin-film may be formed such that the metal precursor gas derived from the metal precursor is thermally decomposed by a $CO_2$-laser 122. The $CO_2$-laser may be irradiated by a typical $CO_2$-laser beam. For example, the $CO_2$-laser may have a wavelength of 9 μm to 11 μm. However, the technical idea of the present invention is not limited thereto. For example, the wavelength of the $CO_2$-laser may be varied depending on the amount of the metal precursor gas.

An optical window 124 according to the present invention may include zinc selenide (ZnSe) having high thermal shock resistance. Specifically, the optical window 124 may be disposed on a lower end of the reactor 120.

The bubbler 100 according to the present invention may include an inlet 100i through which a carrier gas is introduced into the glass vial 90 and an outlet 100o through which the metal precursor gas and the carrier gas are discharged from the glass vial 90. The metal precursor gas derived from the metal precursor may include a material in which liquid metal precursor fine particles are dispersed and suspended in the glass vial 90. That is, the metal precursor gas may be in an aero-sol state in the glass vial.

The inlet 100i according to the present invention may include a carrier gas flow channel 102 through which the carrier gas moves. The carrier gas that is a gas introduced to carry the metal precursor gas may be, e.g., an unreactive gas, specifically a nitrogen gas. The nitrogen gas may have a flow rate, e.g., 1 sccm to 500 sccm and be appropriately adjusted according to the amount of the moving metal precursor gas.

Figure 4:
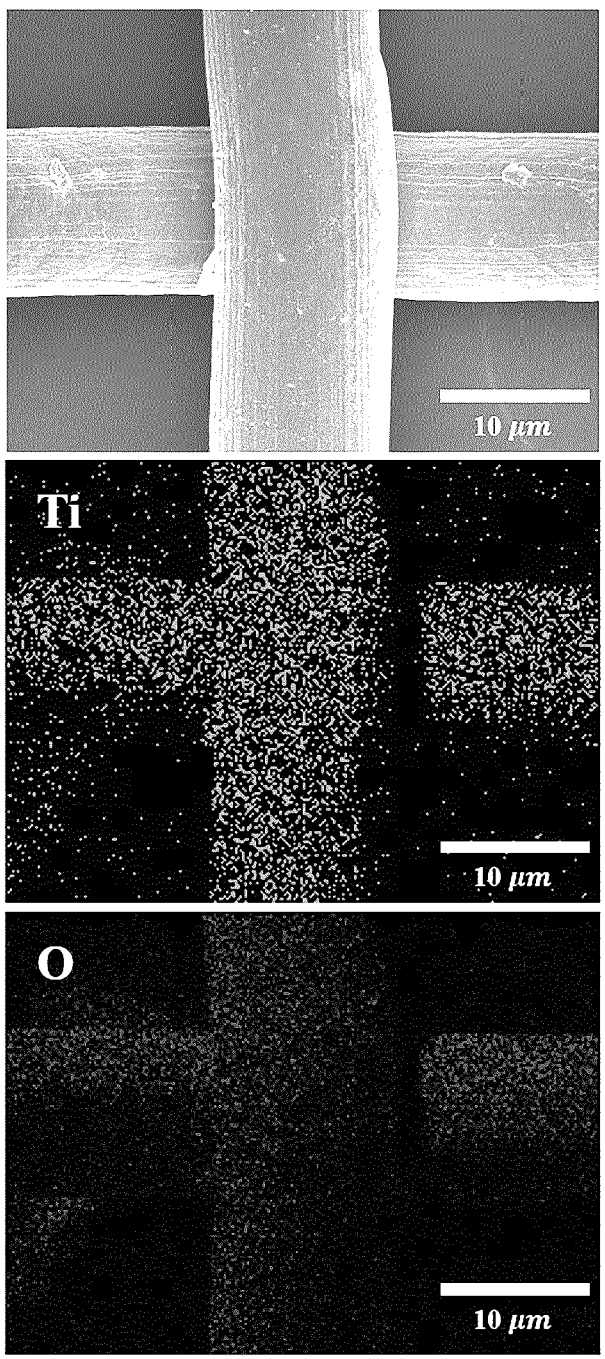
FIG. 4 is an image showing a feature in which a heating wire is disposed on an outer surface of a glass vial 90.

A heating wire may be disposed on an outer surface of the glass vial 90. The heating wire may be mounted in a form of spirally surrounding the glass vial in a close contact manner. As the heating wire is provided, thermal energy may be additionally supplied to the metal precursor gas due to a heat conduction effect caused by the heating wire in addition to thermal radiation of the $CO_2$-laser, and the metal thin-film may be effectively formed on the substrate 140 (refer to FIG. 4).

The reactor 120 according to the present invention may be connected to the bubbler 100 including the metal precursor therein through a gas flow channel GFC. In this specification, a term 'connected' is defined as a feature of being directly connected as well as a feature of being indirectly connected. In this specification, the term 'gas flow channel' is defined as all sorts of flow channels connecting the bubbler 100 and the reactor 120. For example, the gas flow channel GFC may include a first mixed gas flow channel 104 and a second mixed gas flow channel 105 connected to the first mixed gas flow channel 104. The first mixed gas flow channel 104 may be a flow channel from the outlet 100o of the bubbler 100 to a point at which the first mixed gas flow channel 104 crosses a photocatalyst input channel 106, and the second mixed gas flow channel 105 may be a flow channel from the point at which the first mixed gas flow channel 104 crosses the photocatalyst input channel 106 to the inlet of the reactor 120.

The gas flow channel GFC according to the present invention may include a photocatalyst gas to compensate a low absorbance of the metal precursor gas. The photocatalyst gas may absorb energy of the $CO_2$-laser in the reactor and then transfer the absorbed energy to the metal precursor gas. Accordingly, the thermal decomposition of metal precursor gases may be accelerated. The photocatalyst gas may be one selected from commercial photocatalysts of the $CO_2$-laser such as $SF_6$ and $C_2H_4$. The photocatalyst gas introduced through the photocatalyst input channel 106 may be mixed with a gas contained in the first mixed gas flow channel 104 and injected into the reactor 120 through the second mixed gas flow channel 105.

A gas flow channel GFC according to another embodiment of the present invention may further contain a hydrogen gas ($H_2$). Specifically, the hydrogen gas may reduce a metal precursor gas thermally decomposed by a $CO_2$-laser in a reactor 120 to deposit a pure metal thin-film on a substrate 140. The pure metal thin-film may be, e.g., a Ti thin-film. For example, the hydrogen gas may be injected together with a photocatalyst gas through a photocatalyst input channel 106 and introduced into the reactor 120 through the second mixed gas passage 105.

Another embodiment of the present invention may provide an electrode for an electrochemical reaction manufactured by the manufacturing method of the electrode for the electrochemical reaction. The electrode may be, e.g., at least one of an anode and a cathode in an electric generating device for the electrochemical reaction.

2. Reverse Electrodialysis Electric Generating Device

Another embodiment of the present invention may provide a reverse electrodialysis electric generating device including the electrode for the electrochemical reaction.

Figure 5:
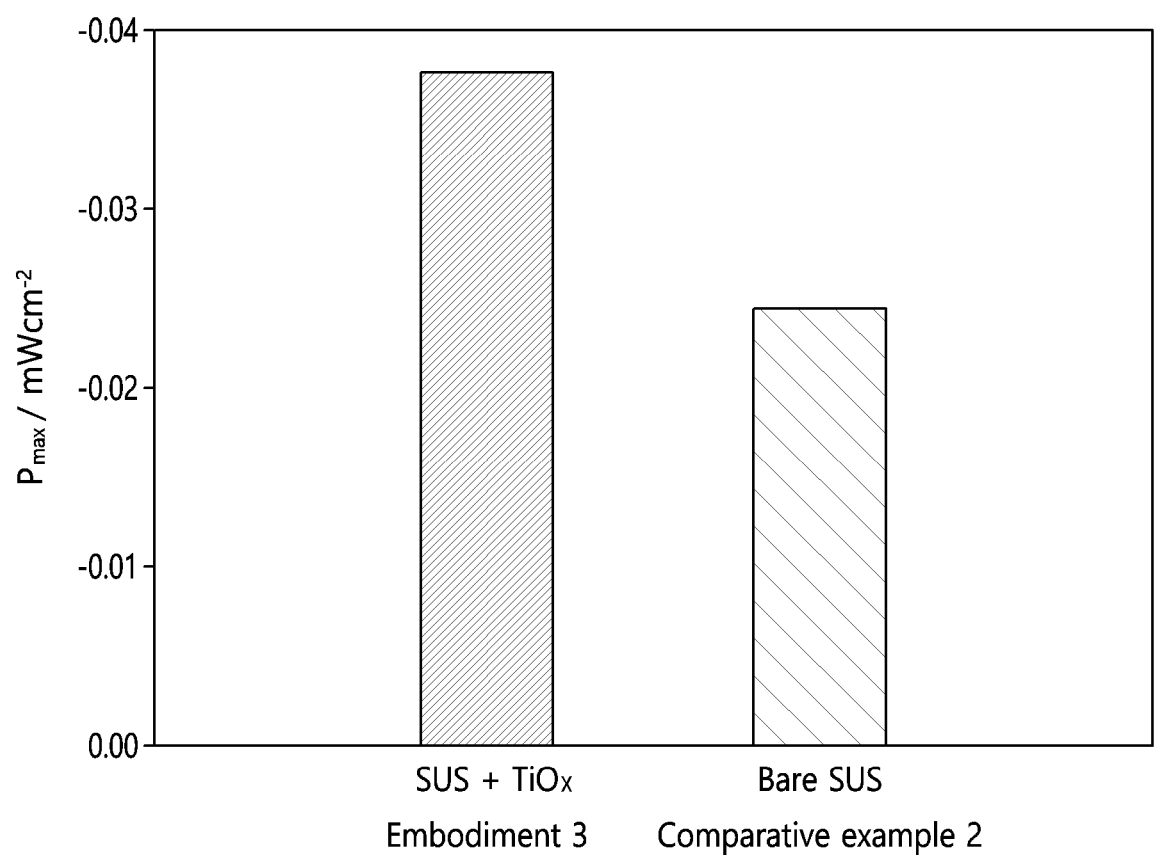
FIG. 5 is a cross-sectional view illustrating a reverse electrodialysis electric generating device according to an embodiment of the present invention.

FIG. 5 is a cross-sectional view of the reverse electrodialysis electric generating device according to an embodiment of the present invention.

Referring to FIG. 5, a reverse electrodialysis electric generating device according to the present invention may be a device in which a first cation exchange membrane 202, an anion exchange membrane 204, and a second cation exchange membrane 206 are sequentially arranged in a thickness direction of the membrane.

The reverse electrodialysis electric generating device according to the present invention may include a freshwater flow channel 210 between the first cation exchange membrane 202 and the anion exchange membrane 204 and a seawater flow channel 212 between the anion exchange membrane 204 and the second cation exchange membrane 206. A spacer 240 may be disposed on each of the freshwater flow channel 210 and the seawater flow channel 212.

An anode 300 according to the present invention may be disposed in a space between the first cation exchange membrane 202 and a first end plate 220. A cathode 302 according to the present invention may be disposed in a space between the second cation exchange membrane 206 and a second end plate 222. At least one of the anode 300 and the cathode 302 may be, e.g., an electrode in which a Ti thin-film or a $TiO_2$ thin-film is formed on a substrate.

A first cleaning solution flow channel 214 may be disposed in the space between the first cation exchange membrane 202 and the first end plate 220, and a second cleaning solution flow channel 216 may be disposed in the space between the second cation exchange membrane 206 and the second end plate 222. Each of the first cleaning solution flow channel 214 and the second cleaning solution flow channel 216 may be a space through which a cleaning solution containing an electrolyte and an oxidation/reduction redox couple material flow, and the solution may be circulated in the space. The electrolyte may be, e.g., an anode solution and/or a cathode solution in which an electrode is submerged.

The reverse electrodialysis electric generating device has an operation principle by which an anion ($Cl^-$) moves from the seawater flow channel 212 to the freshwater flow channel 210 through the anion exchange membrane 204, and a cation (Nat) moves from the seawater flow channel 212 to the second cleaning solution flow channel 216 through the second cation exchange membrane 206. Here, the moved cation (Nat) moves from the second cleaning solution flow channel 216 to the first cleaning solution flow channel 214 due to a flow of the cleaning solution and then moves from the first cleaning solution flow channel 214 to the freshwater flow channel 210 through the first cation exchange membrane 202. When the above process is generated consecutively, a solution having a concentration greater than that of initial freshwater salt may be realized through the freshwater flow channel 210, and a solution having a concentration less than that of initial seawater salt may be realized through the seawater flow channel 212 and discharged through an outlet.

This reverse electrodialysis electric generating device may make a difference in chemical potential by using a salinity difference from the freshwater and the ion exchange membrane. Accordingly, a chemical potential may be converted into an electrical potential by using the redox couple material to resultantly produce electricity. Since the reverse electrodialysis electric generating device according to the present invention directly converts chemical energy into electrical energy as with a general battery, the reverse electrodialysis electric generating device may respond quickly to energy demand and reduce energy loss generated during process conversion in comparison with a typical electric generating method using a turbine.

Hereinafter, the embodiments of the present invention will be described in detail so that those skilled in the art can easily implement the present invention, but this is only an example, and the scope of the present invention is not limited to descriptions below.

Manufacturing Example 1: Manufacturing of Electrode for Electrochemical Reaction Comparative Example 1: Commercial SUS Mesh Electrode As a comparative example 1, a commercial stainless steel mesh electrode (SUS304-0.14 mm×60 mesh from Korea International Co., Ltd.) is used.

Embodiment 1: Manufacturing of Electrode in which $TiO_2$ Thin-Film is Deposited on Surface of SUS Mesh (a) Process: Bubbler Condition Setting As illustrated in FIGS. 1 and 2, the bubbler 100 is a device for vaporizing a liquid metal precursor (titanium tetraisopropoxide (TTIP)) and introducing the liquid metal precursor into the reactor. The inlet 100i through which a nitrogen gas (4 torr, 50 sccm) is introduced into the commercial glass vial 90 and the outlet 100o through which the nitrogen gas and the metal precursor gas are discharged are manufactured, and then pressure is adjusted to 4 torr as an evaporation condition in the bubbler.

(b) Process: $TiO_2$ thin-Film forming process using $CO_2$-Laser

As illustrated in FIGS. 1 and 2, the metal precursor gas vaporized in the glass vial 90 is mixed with a nitrogen gas N2 that is a carrier gas and moves through the first mixed gas flow channel 104. The mixed gas moved through the first mixed gas flow channel 104 is mixed with sulfur hexafluoride ($SF_6$; 20 sccm) introduced through the photocatalyst input channel 106 and introduced into the reactor 120 through the second mixed gas flow channel 105. The mixed gas introduced into the reactor 120 is thermally decomposed by the $CO_2$-laser 122 irradiated from a lower end (laser beam from Rofin-Sinar Co., Ltd.; SR 10i) of the reactor to produce titanium dioxide ($TiO_2$) The generated titanium dioxide ($TiO_2$) is deposited on a surface of a substrate 140 (SUS mesh) mounted to a central portion of the reactor 120 to form a $TiO_2$ thin-film. As a result, the electrode for the electrochemical reaction according to the embodiment 1 may be manufactured.

Embodiment 2: Electrode in which Thin-Film is Deposited on Surface of SUS Mesh

The electrode for the electrochemical reaction is manufactured in the same manner as the embodiment 1, in which the metal precursor gas is additionally mixed with a hydrogen gas ($H_2$; 20 sccm) introduced through the photocatalyst input channel 106 in addition to the nitrogen gas ($N_2$) and the sulfur hexafluoride ($SF_6$; 20 sccm) to finally manufacture the electrode for the electrochemical reaction according to the embodiment 2 in which a Ti thin-film is formed on the substrate 140 (SUS mesh).

Experimental Example 1: SEM-EDS Image of Electrode According to Embodiment 2

Figure 6:
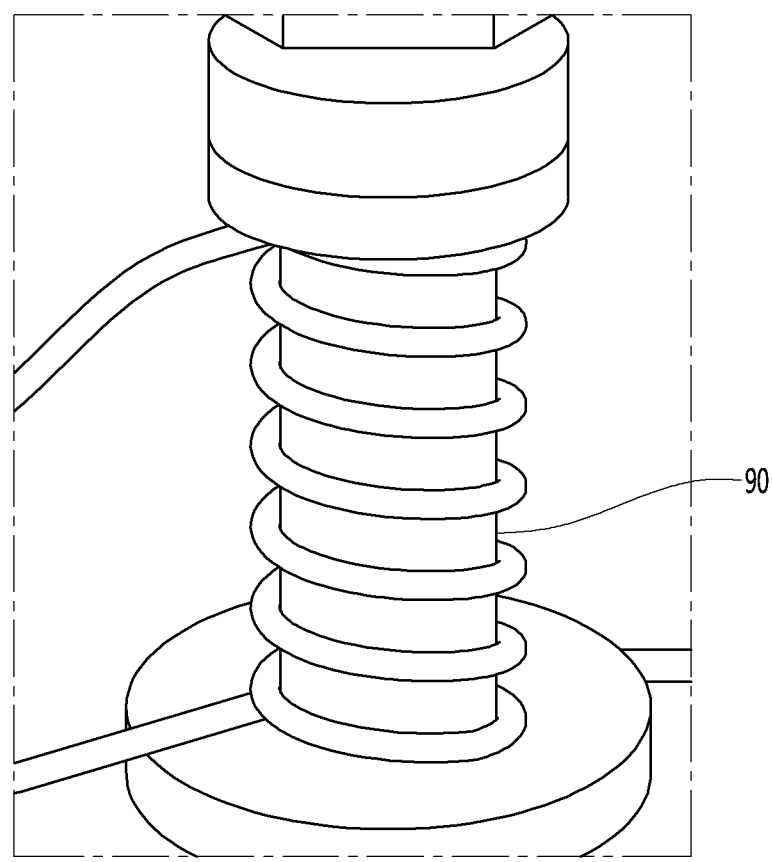
FIG. 6 is a scanning electron microscopy-energy dispersive X-ray spectroscopy (SEM-EDS) image of an electrode for an electrochemical reaction according to an embodiment 2.

FIG. 6 is a scanning electron microscopy-energy dispersive X-ray spectroscopy (SEM-EDS) image of an electrode for an electrochemical reaction according to the embodiment 2.

Referring to FIG. 6, a Ti thin-film is uniformly formed on the surface of the substrate (SUS mesh).

Manufacturing Example 2: Manufacturing of Reverse Electrodialysis Electric Generating Device Comparative Example 2: Reverse Electrodialysis Electric Generating Device According to Comparative Example 1

The reverse electrodialysis electric generating device according to the present invention is manufactured by using a commercial CMV-N (5 cm×5 cm from Selemion Co., Ltd.; an effective area of 25 cm$^2$ and a thickness of 120 m) as the cation exchange membrane, a commercial AMV-N (5 cm×5 cm from Selemion Co., Ltd.; an effective area 25 cm$^2$ and a thickness of 120 m) as the anion exchange membrane, and the electrode according to the comparative example 1 as the anode and the cathode, by fixing an inflow rate of seawater (0.513 M) and freshwater (0.0085 M) at 5 mL/min and setting an anode solution (0.05 M, supersaturated $K_4Fe(CN)_6$) in which the cathode (3 cm×3 cm; an effective area of 9 cm$^2$) is submerged and a cathode solution (0.05 M, supersaturated $K_3Fe(CN)_6$) in which the cathode (3 cm×3 cm; an effective area of 9 cm$^2$) is submerged to the above-described condition.

Embodiment 3: Reverse Electrodialysis Electric Generating Device According to Embodiment 2

The reverse electrodialysis electric generating device is manufactured in the same manner as in the comparative example 2, in which the electrodes according to the embodiment 2 are used as the anode and the cathode instead of the electrodes according to the comparative example 1.

Experimental Example 2: Comparison of Maximum Power Densities of Reverse Electrodialysis Electric Generating Devices According to Comparative Example 2 and Embodiment 3

Figure 7:
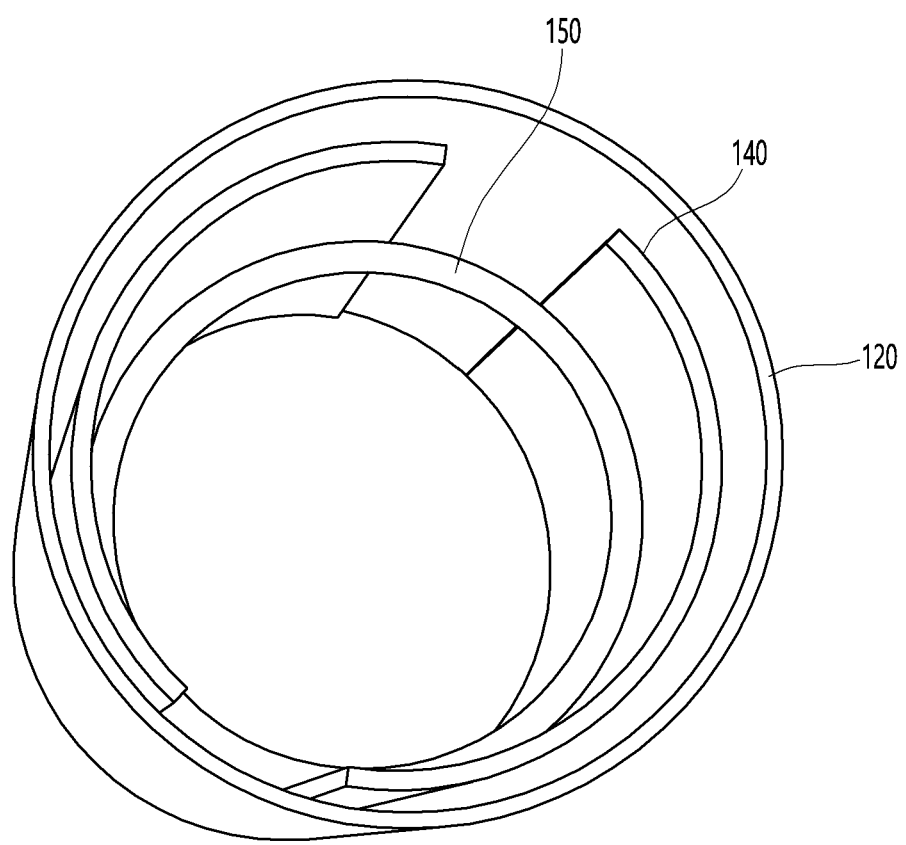
FIG. 7 is a graph showing comparison of maximum power densities of reverse electrodialysis generating devices according to a comparative example 2 and an embodiment 3.

FIG. 7 is a graph showing comparison of maximum power densities of the reverse electrodialysis generating devices according to the comparative example 2 and the embodiment 3.

Referring to FIG. 7, the reverse electrodialysis electric generating device (the embodiment 3) including the electrode in which the titanium (Ti) thin-film is deposited on the surface of the SUS mesh has the maximum power density increased by approximately 54% in comparison with the reverse electrodialysis electric generating device (the comparative example 2).

When the above-described experimental result is comprehensively analyzed, the metal precursor gas in the reactor is rapidly thermally decomposed by the $CO_2$-laser so that the metal thin-film is rapidly deposited onto the substrate according to an embodiment of the present invention. Accordingly, a loss of the metal precursor may be minimized, and a manufacturing time and cost may be reduced. Also, according to an embodiment of the present invention, the maximum power density of the electric generating device for the electrochemical reaction may be increased by using the electrode manufactured by the manufacturing method of the present invention.

The embodiment of the present invention may provide the manufacturing method of the electrode for the electrochemical reaction, which is capable of minimizing the loss of the metal precursor and reducing the manufacturing time and the electrode manufactured by the manufacturing method.

The embodiment of the present invention may increase the maximum power density by applying the electrode for the electrochemical reaction, which is manufactured by the manufacturing method according to the present invention, to the electrochemical electric generating device.

In addition to the above-described effects, specific effects of the present invention will be described together while explaining specific details below for implementing the present invention.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A manufacturing method of an electrode for an electrochemical reaction, comprising a process of forming a metal thin-film on a porous substrate disposed in a reactor, wherein,
   the metal thin-film is formed as a metal precursor gas derived from a metal precursor which is thermally decomposed by a $CO_2$-laser,
   the reactor is connected to a bubbler comprising the metal precursor therein through a gas flow channel,
   the gas flow channel comprises a photocatalyst gas, and the gas flow channel further comprises $H_2$ gas,
   wherein the porous substrate is stainless steel mesh.

2. The manufacturing method of claim 1, wherein the metal precursor is one selected from the group consisting of a titanium precursor, a ruthenium precursor, an iridium precursor, and a combination thereof.

3. The manufacturing method of claim 2, wherein the titanium precursor is a titanium tetraisopropoxide (TTIP).

4. The manufacturing method of claim 1, wherein the photocatalyst gas is $SF_6$ or $C_2H_4$.

5. The manufacturing method of claim 1, wherein the bubbler comprises:
   an inlet through which a carrier gas is introduced thereinto; and
   an outlet through which the metal precursor gas and the carrier gas are discharged to the reactor.

6. An electrode for an electrochemical reaction manufactured by the method of claim 1.

7. A reverse electrodialysis electric generating device comprising the electrode for the electrochemical reaction of claim 6.

* * * * *